(12) United States Patent
Mazur et al.

(10) Patent No.: US 12,707,143 B2
(45) Date of Patent: Aug. 11, 2026

(54) ROBUST OPTICAL MONITORING DEVICE AND OPERATING METHOD THEREOF

(71) Applicant: Carrier Corporation, Palm Beach Gardens, FL (US)

(72) Inventors: Mateusz Mazur, Sopot (PL); Rajiv Ranjan, Riverview, FL (US); Marcin Piech, East Hampton, CT (US); Leszek Wolski, Reda (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 132 days.

(21) Appl. No.: 18/632,738

(22) Filed: Apr. 11, 2024

(65) Prior Publication Data

US 2024/0348918 A1 Oct. 17, 2024

Related U.S. Application Data

(60) Provisional application No. 63/496,175, filed on Apr. 14, 2023.

(51) Int. Cl.
*H04N 23/661* (2023.01)
*F24F 11/88* (2018.01)
(Continued)

(52) U.S. Cl.
CPC ........... *H04N 23/662* (2023.01); *F24F 11/88* (2018.01); *F24F 11/89* (2018.01); *F24F 13/20* (2013.01);
(Continued)

(58) Field of Classification Search
CPC ...... H04N 23/662; H04N 23/56; H04N 7/183; H04N 23/52; F24F 11/88; F24F 11/89;
(Continued)

(56) References Cited

U.S. PATENT DOCUMENTS 5,391,891 A 2/1995 Wiegleb et al.
5,414,257 A 5/1995 Stanton
(Continued)

FOREIGN PATENT DOCUMENTS

EP 4145845 A1 3/2023
JP 2000104982 A 4/2000
(Continued)

OTHER PUBLICATIONS

Extended European Search Report received for EP Application No. 24170102.8, mailed on Sep. 16, 2024, 10 Pages.

*Primary Examiner* — Yogesh K Aggarwal
(74) *Attorney, Agent, or Firm* — Drew Folgmann

(57) ABSTRACT

Embodiments of the disclosure describe a robust optical monitoring device and an operating method thereof. The optical monitoring device includes a housing comprising a first compartment and a second compartment. The first compartment includes a camera circuit board and a wireless connection circuit board, wherein the second compartment comprises a supply circuit board. Further, the housing includes an isolation cell to isolate the first compartment and the second compartment, a camera configured to be disposed in the first compartment of the housing to receive images associated with a sight glass, and an illumination board disposed within the first compartment of the housing positioned to project light for operation of the camera.

20 Claims, 10 Drawing Sheets

(51) Int. Cl.

| | |
|---|---|
| ***F24F 11/89*** | (2018.01) |
| ***F24F 13/20*** | (2006.01) |
| ***G01K 1/024*** | (2021.01) |
| ***G01K 1/14*** | (2021.01) |
| ***H04N 23/56*** | (2023.01) |

(52) U.S. Cl.
CPC ............... *G01K 1/024* (2013.01); *G01K 1/14* (2013.01); *H04N 23/56* (2023.01); *G01K 2201/00* (2013.01)

(58) Field of Classification Search
CPC .. F24F 13/20; F24F 11/30; F24F 11/52; F24F 11/64; F24F 2110/10; G01K 1/024; G01K 1/14; G01K 2201/00; G01N 21/81; G01N 21/01; G05B 19/04
See application file for complete search history.

(56) References Cited

U.S. PATENT DOCUMENTS

| | | | | |
|---|---|---|---|---|
| 5,560,245 | A | 10/1996 | Zettler et al. | |
| 7,726,876 | B2 | 6/2010 | Laverdiere et al. | |
| 8,271,198 | B2 | 9/2012 | Teder | |
| 10,347,114 | B2 | 7/2019 | Johnson et al. | |
| 10,880,460 | B2 | 12/2020 | Rukes et al. | |
| 11,115,569 | B1 | 9/2021 | Myers et al. | |
| 11,363,172 | B1 * | 6/2022 | Leshniak ............... | G03B 17/02 |
| 2002/0092974 | A1 | 7/2002 | Kouznetsov | |
| 2010/0243748 | A1 | 9/2010 | Narikawa et al. | |
| 2021/0396697 | A1 | 12/2021 | Jessenig et al. | |
| 2022/0297510 | A1 | 9/2022 | Kondrk et al. | |
| 2023/0073702 | A1 * | 3/2023 | Xiong .................... | H04N 23/80 |

FOREIGN PATENT DOCUMENTS

| | | | |
|---|---|---|---|
| JP | 2021169902 | A | 10/2021 |
| WO | 9323739 | A1 | 11/1993 |
| WO | 2022045369 | A1 | 3/2022 |

* cited by examiner

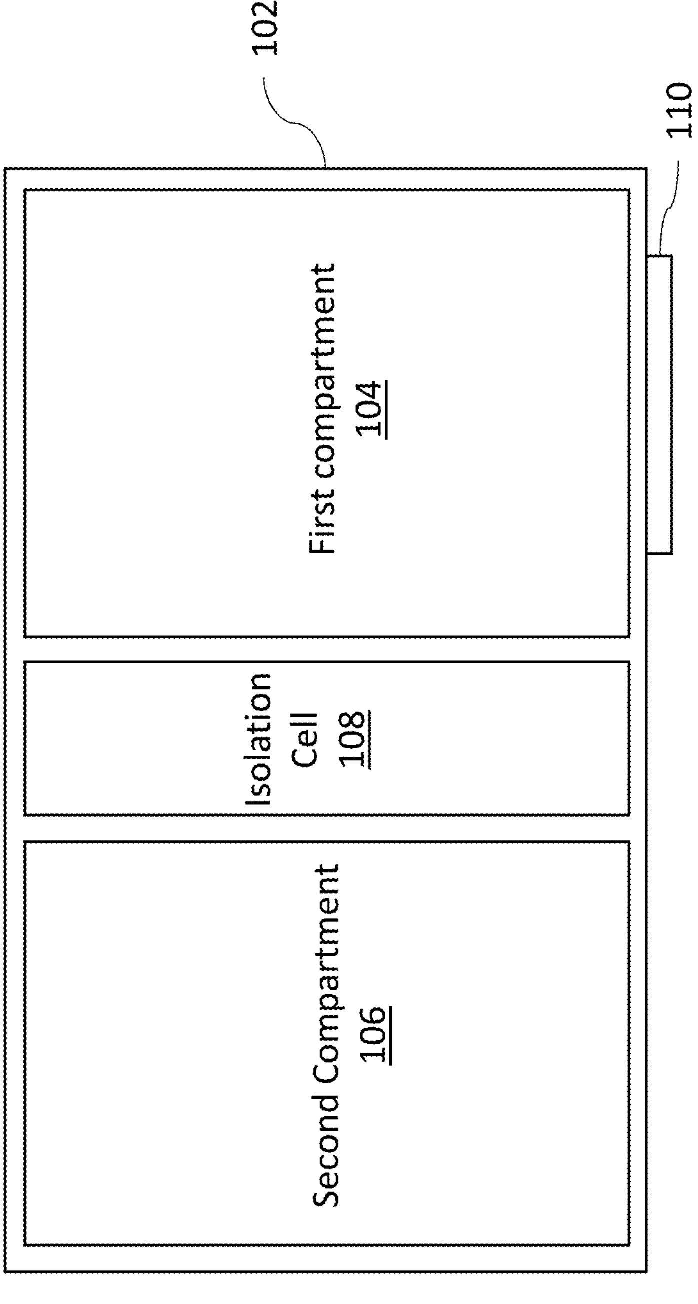
Figure 1A

ROBUST OPTICAL MONITORING DEVICE AND OPERATING METHOD THEREOF

CROSS REFERENCE TO RELATED APPLICATION

This application claims the benefit of U.S. Provisional Patent Application No. 63/496,175 filed on Apr. 14, 2023, which is incorporated by reference herein in its entirety.

FIELD OF THE INVENTION

The disclosure generally relates to an optical monitoring device and more particularly relates to a robust optical monitoring device capable of reducing the impact of high temperature on its performance and a method of operating the same in a Heating Ventilation Air Conditioning and Refrigeration (HVAC/R) system.

BACKGROUND

Current HVAC/R systems are used with refrigerants that are either near or below atmospheric pressure. Such refrigerants tend to absorb moisture and inhibit chiller performance. Therefore, HVAC/R systems are required to be monitored for moisture level in the refrigerant. For this purpose, HVAC/R systems are employed with sight glass with a color-changing material exposed to the refrigerant stream, with the color indicating a moisture level of the refrigerant.

While initial sight glass installations required operators of the HVAC/R system to periodically check the sight glass for indications, developments are made to provide an autonomous monitoring solution in the form of an optical monitoring device capable of sending moisture level status in the refrigerant cycle to the HVAC/R system and thereby removing the need of human inspections. Said monitoring device essentially comprises a camera to capture images of the sight glass, an illumination mechanism, and a wireless connection circuit to communicate the sight glass images captured by the camera wirelessly. Based on these images, conditions such as moisture content exceeding prescribed levels, insufficient refrigerant charge, or presence of non-condensable gases are detected, and necessary actions are performed.

However, various issues have been identified in the above solution. For instance, heat generated from the power supply of the optical monitoring device causes high temperatures which not only reduce the performance of the camera, but also hamper the wireless connection. For example, heat may be generated when an AC power input to the monitoring device is converted into DC. Further, it has also been shown that continuous wireless operation may raise the ambient temperature by over 20-30 degrees Celsius. Such high temperatures may exceed a predefined maximum system temperature suitable for electronic circuits and particularly for the wireless connectivity circuits. This may result in a weak, intermittent, or no wireless connection. Moreover, no measures have been suggested previously to improve the illumination quality of the sight glass or deal with fog accumulation on its surface.

Accordingly, there remains a need to provide a robust monitoring system capable of reducing the temperature impact and solving the issues as recognised above concerning the current solution.

SUMMARY

This summary is provided to introduce a selection of concepts, in a simplified format, that are further described in the detailed description of the disclosure. This summary is neither intended to identify key or essential inventive concepts of the disclosure nor is it intended for determining the scope of the disclosure.

Disclosed is an optical monitoring device comprising: a housing comprising a first compartment and a second compartment, the first compartment comprising a camera circuit board and a wireless connection circuit board, wherein the second compartment comprises a supply circuit board, and wherein the housing further comprises: an isolation cell to isolate the first compartment and the second compartment, a camera configured to be disposed in the first compartment of the housing to receive images associated with a sight glass, and an illumination board disposed within the first compartment of the housing positioned to project light for operation of the camera.

In one or more embodiments, the isolation cell comprises at least one cable to connect the camera circuit board and the illumination board with the supply circuit board.

In one or more embodiments, the housing is configured to be mounted on a Heating, Ventilation, Air Conditioning and Refrigeration (HVAC/R) system, the HVAC/R system comprising the sight glass within a piping network.

In one or more embodiments, the optical monitoring device further comprises a moisture absorber in the isolation cell, wherein the moisture absorber comprises one of a hydrogel and silica gel.

In one or more embodiments, the optical monitoring device further comprises a light dispersion layer placed between the illumination board and the sight glass of the HVAC/R system.

In one or more embodiments, the camera is placed at a predefined distance from the sight glass of an HVAC/R system.

In one or more embodiments, the optical monitoring device further comprises a guiding mechanism to guide heat generated from the supply circuit board of the second compartment towards the sight glass.

Also disclosed herein is a Heating, Ventilation, and Air Conditioning (HVAC/R) system comprising the optical monitoring device, wherein the HVAC/R system further comprises the sight glass, the sight glass including an anti-fog film.

Further disclosed is a method of operating an optical monitoring device mounted on a Heating, Ventilation, and Air Conditioning (HVAC/R) system. The method comprises: measuring a temperature at an optical monitoring device determining whether the measured temperature is less than a predefined threshold temperature; in response to determining that the measured temperature is less than the predefined threshold temperature, establishing, by the optical monitoring device, a wireless connection to transmit at least one image, to be captured by a camera; in response to receipt of a trigger, capturing, by the camera, the at least one image of a sight glass of the HVAC/R system; and transmitting the at least one image over the wireless connection.

In one or more embodiments, the trigger comprises one of a manual trigger received via an application or an automated trigger received from a controller.

In one or more embodiments, wherein in response to determining that the measured temperature is more than the predefined threshold temperature, the method comprises reporting an abnormal operating status of the optical monitoring device to the controller or a remote application hosted on a user device.

To further clarify the advantages and features of the method and system, a more particular description of the method and system will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein:

FIG. 1A illustrates a general cross-sectional view of an optical monitoring device;

Figure 1B:
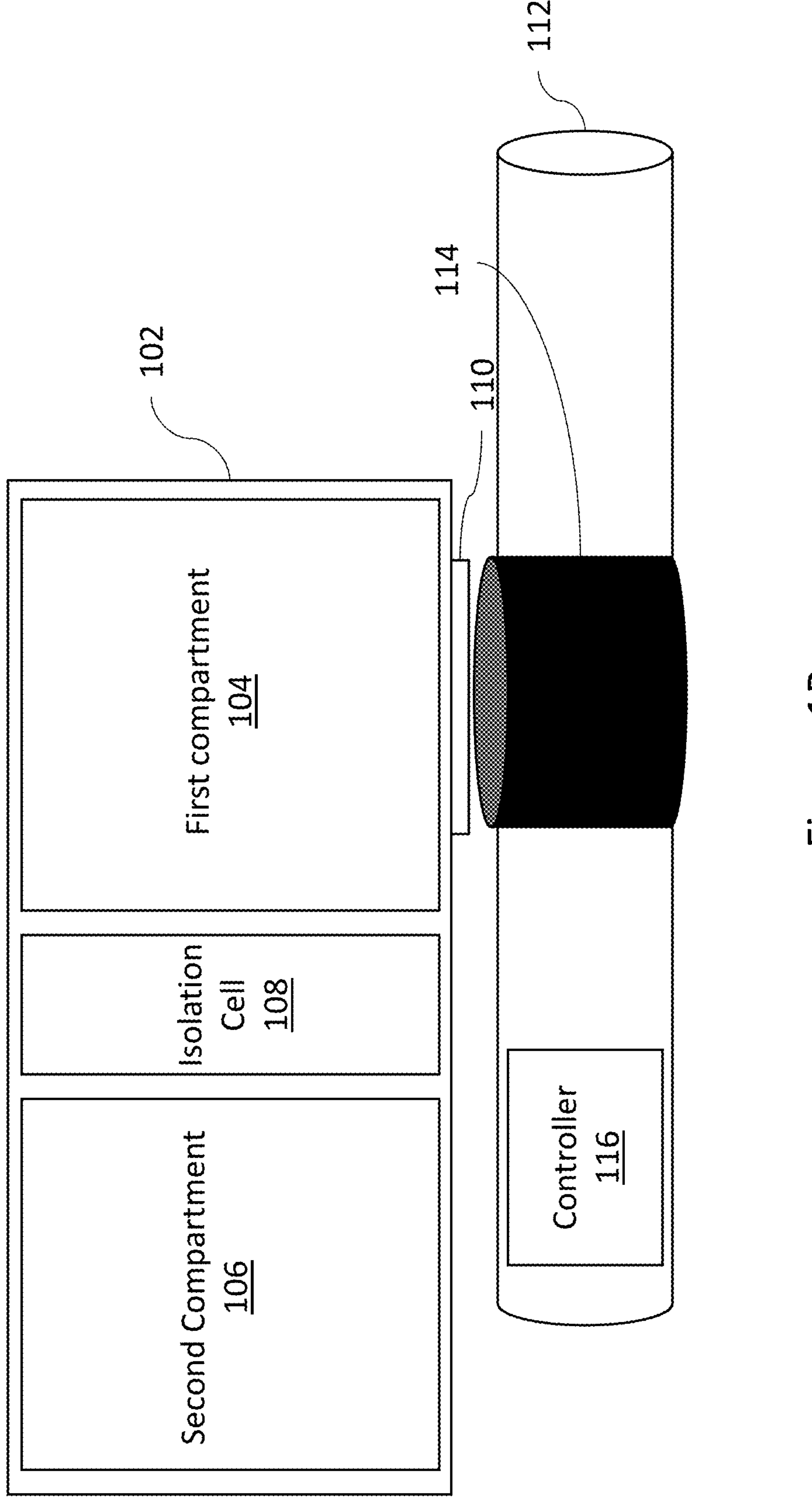
FIG. 1B illustrates a heating, ventilation, and air conditioning and refrigeration (HVAC/R) system having sight glass and the optical monitoring device installed thereupon.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

FIG. 1A illustrates a general cross-sectional view of an optical monitoring device 100.

In an embodiment, the optical monitoring device 100 may include a housing 102. The housing 102 may include a first compartment 104 and a second compartment 106. The housing 102 may be made of a metal (e.g., aluminium, iron, alloys thereof, and the like), a plastic (e.g., polyethylene, polyethylene terephthalate (PET), polyvinylchloride (PVC), polyoxymethylene (POM), polycarbonate, polytetrafluoroethylene (PTFE), acrylonitrile butadiene styrene (ABS), and the like), or a combination including at least one of the foregoing. In an exemplary embodiment, one or more metal parts of the housing 102 may be treated as heat transfer elements or radiators. The first compartment 104, as described in greater detail in the following paragraphs with respect to FIG. 2, may include a camera circuit board, a wireless connection circuit board, and an illumination board arranged to illuminate and view a window 110 formed by an opening/aperture at an outer periphery of one of the walls of the housing 102. In an embodiment, an optically transmissive material (not shown) such as, but not limited to, glass, clear plastic sheet, or the like, may be placed in the window 110 to prevent the entry of debris, moisture, insect, or the like into the housing 102 while still permitting the view through the window 110.

The second compartment 106, as described in greater detail in the following paragraphs with respect to FIG. 3, may include a supply circuit board arranged to provide power to components of the optical monitoring device 100, such as a camera circuit board, an illumination board, and the like.

The first compartment 104 and the second compartment 106 may be separated from each other by an isolation cell 108. In an embodiment, the isolation cell 108, as described in detail in the following paragraphs with respect to FIG. 4, may be arranged to thermally isolate the first compartment 104 and the second compartment 106, and guide cables between the circuit boards of both the compartments. The optical monitoring device 100 may be installed on a pipe of the piping system of an HVAC/R system 112 to monitor the condition of a color changing material and the fluid flowing through a sight glass 114, as shown in FIG. 1B.

Figure 2:
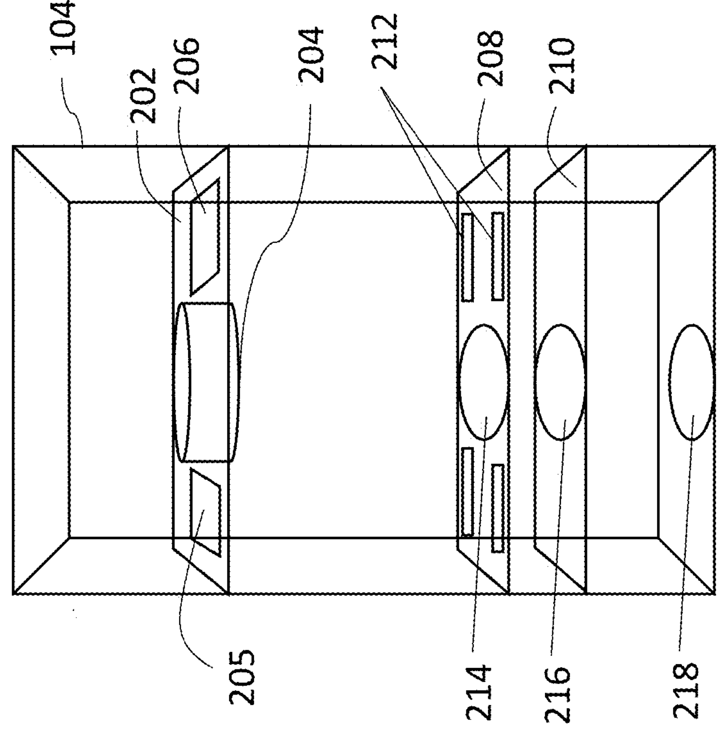
FIG. 2 illustrates a detailed view of the first compartment of the optical monitoring device.

FIG. 2 illustrates a detailed view of the first compartment 104 of the optical monitoring device 100.

As illustrated, the first compartment 104 may include a camera circuit board 202 which may house a camera 204, a processing unit 205, and a wireless connection circuit board 206. The camera 204 may include any suitable digital camera capable of capturing images. In present invention, the camera 204 captures photos of the sight glass 114 placed on the HVAC/R system 112. For example, the camera 204 may be any board-level camera, e.g., mounted in electrical communication with, and directly onto, the camera circuit board 202.

The processing unit 205 may be in communication with the camera 204 and the wireless connection circuit board 206. The processing unit 205 may include firmware to identify color of sight glass 114. Said firmware may be a set of instructions executable by the processing unit 205 to recognise the color of sight glass 114 from the images taken by the camera 204 and sets its registers with binary information about dry/wet or abnormal color of sight glass 114. The process of capturing images from the camera 204 and recognising the color of the sight glass 114 to get one or more sets of binary information may be repeated for n number of times. An average of the one or more binary set may be computed and the resulting average binary information may be logged in the registers of the processing unit 205.

In an embodiment, the processing unit 205 may be a controller or a processor. For instance, the processing unit 205 may include a central processing unit (CPU) or similar controller (e.g., programmable gate array (FPGA), application specific integrated circuit (ASIC)) for processing image data output from the camera 204. The processing unit 205 may exchange the binary information between the optical monitoring device 100 and a controller 116 of the HVAC/R system 112. In an embodiment, the information may be exchanged with the controller 116 using a Modbus cable. The HVAC/R controller 116 may pull that information from the optical monitoring device 100 and may process it to take relevant actions.

The HVAC/R controller 116 may provide the information from the optical monitoring device 100 for a first threshold period of time. For example, in case abnormal color of the sight glass 114 is detected, such information may be provided by displaying either on a display monitor of the optical monitoring device 100 or on the user interface of an application installed on the user equipment. In another embodiment, the controller 116 may issue an alarm after the first threshold period of time is expired and wait for a second threshold period of time for the system 112 to be repaired. In yet another embodiment, if the second threshold period of time is also expired and the system 112 has not been repaired, the controller 116 may automatically switch off the HVAC/R system 112.

The wireless connection circuit board 206 may be in communication with the camera 204 and the processing unit 205. The wireless connection circuit board 206 may be adapted to transmit image data captured from the camera 204 to an external device for example, via a wireless network such as Bluetooth, Bluetooth low energy, Wi-Fi, ZigBee, Z-wave, or the like. The external device may include user device, such as, but not limited to, a mobile phone, tablet, or portable computer. In some scenarios when visual inspection of the sight glass 114 may not be possible, the wireless connection circuit board 206 may be used to support wireless connection to send images of the sight glass 114 to a web server on an operator's demand. The web server and its contents may be accessible by the external devices, via an application installed thereon.

In an embodiment, the camera circuit board 202 may be positioned at a distance from the sight glass 114 that is sufficient to provide optimum optical focal length within the optical monitoring device 100. In an exemplary embodiment, the camera circuit board 202 may be mounted in handles fixed in the enclosure of the first compartment 104 at about 10 cm from the position of the window 110. Consequently, the impact, on the camera 204, of the temperature in the sight glass of the HVAC/R system or the pipe of the piping system of the HVAC/R system 112 passing through the sight glass 114 may be reduced by the distance maintained between camera circuit board 202 and the sight glass 114 visible through the window 110 of the optical monitoring device 100. In another exemplary embodiment, the distance of the camera circuit board 202 may be maintained from the window 110 of the optical monitoring device 100 since the distance relation between the window 110 and the sight glass 114 is constant.

The distance between the camera circuit board 202 and the window 110 may make room for the implementation of an illumination board which may project light at the window 110 and illuminate the view of the camera 204 installed on the camera circuit board 202.

An illumination board 208 may be installed between the camera circuit board 202 and the window 110 of the optical monitoring device 100. The illumination board 208 may include one or more light sources 212 disposed in operable communication with the power supply (supply board 302, located in the second compartment 106 of the optical monitoring device 100), and an aperture 214. The aperture 214 may be provided in a line-of-sight through the illumination board 208. The aperture 214 may allow the lens of the camera 204 to view the window 110 through the illumination board 208. The illumination of the one or more light sources 212 may be controlled, for example, by allowing power to flow from the power supply to the one or more light sources 212 when the camera 204 is used to capture images of the sight glass 114. In an embodiment, the one or more light sources 212 may include any suitable light source, such as but not limited to, light emitting diodes (LED), organic LEDs, polymer LEDs, and other electroluminescence sources.

A light dispersion layer 210 may be placed between the illumination board 208 and the sight glass 114 of the HVAC/R system 112. In an embodiment, the light dispersion layer 210 may be arranged to uniformly spread the light coming from the light sources of the illumination board 208. The light dispersion layer 210 may be placed in a non-intrusive manner such that field of view of the camera 204 is not obscured. In an embodiment, the light dispersion layer 210 may be placed within a predefined threshold distance from the illumination board 208. In an exemplary embodiment, the light dispersion layer 210 may be at a 5 mm distance from the illumination board 208. In an exemplary embodiment, the distance of the light dispersion layer 210 from the illumination board 208 may not be more than 10 mm. In another exemplary embodiment, the light dispersion layer 210 may be integrated with the light sources on the illumination board 208. For instance, the dispersion layer 210 may be placed as a paint or separately, for example, as a rectangular layer with an aperture 216 to allow the camera 204 to operate.

Additionally, the light dispersion layer 210 may provide thermal isolation to the components contained within the first compartment of the optical monitoring device 100. For instance, the light dispersion layer 210 may be made of a heat-resistant material such as, but not limited to, polycarbonate, acrylic or PMMA—Poly (methyl methacrylate). The light dispersion layer 210 may impact the heat flow and acts as a separate layer which may partially isolate upper part of first compartment with the circuit boards from the sight glass 114 and the pipe of the HVAC/R system 112. In an embodiment, the light dispersion layer 210 may include another aperture 216 aligned with the aperture 212 of the illumination board 208 to enable the camera 204 to view the window 110 of the optical monitoring device 100 therethrough. The light dispersion layer 210 may be a sheet made of materials including, but not limited to, polycarbonate, acrylic or PMMA—Poly (methyl methacrylate). A final aperture 218 looking over the window 110 may be provided at the bottom of the first compartment 104. The final aperture 218 may be aligned with the lens of the camera 204, the aperture 214 of the illumination board 208, and the aperture 216 of the light dispersion layer 210. The apertures 214, 216, and 218 may provide a clear line of sight to the camera 204 for viewing the sight glass 114 through the window 110.

Figure 3:
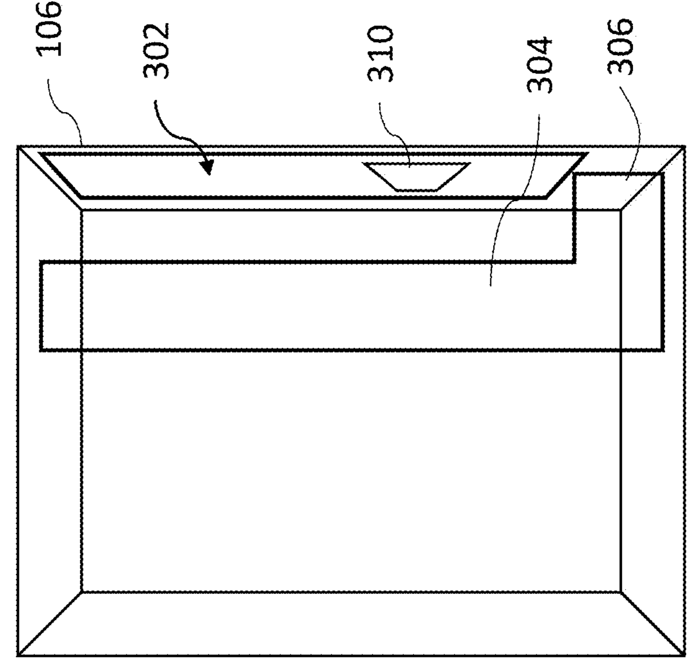
FIG. 3 illustrates a detailed view of the second compartment of the optical monitoring device.

FIG. 3 illustrates a detailed view of the second compartment 106 of the optical monitoring device 100.

The second compartment 106 may include a supply circuit board 302 to provide power supply to the components of the optical monitoring device 100. The supply circuit board 302 may be aligned to the vertical wall adjacent to the adjacent cell, i.e., the isolation cell 108. The supply circuit board 302 may include any suitable source for power supply, for example, but not limited to, a local power grid, site power supply, or a self-contained power storage device. In an embodiment, the supply circuit board 302 may be connected with the controller 116 of the HVAC/R system 112 and draws power directly from the controller 116. The supply circuit board 302 is the component of the optical monitoring device 100 which generates heat while converting AC power input into DC power output and causes the ambient temperature to rise within the optical monitoring device 100. Encapsulating the supply circuit board 302 in a separate enclosure (i.e., the second compartment 106) may thermally isolate and thereby prevent other components of the optical monitoring device 100 from the impact of high temperature caused by the supply circuit board 302.

The heat generated by the supply circuit board 302 may prevent the accumulation of moisture on the components of the second compartment 106 since the dew point of the compartment gets elevated from the high ambient temperature, thereby avoiding condensation. Therefore, any possibility of a short circuit in the power components of the supply board circuit 302 is reduced. In an embodiment, the heat generated in the second compartment may be used to dry the sight glass and eliminate moisture therefrom. The second compartment 106 may include a guiding mechanism 304 to guide the heat flow from the second compartment towards the window 110 of the optical monitoring device 100 and direct it onto the sight glass of the HVAC/R system. In an exemplary embodiment, the guiding mechanism 304 may include a covering made of heat-resistant material. The covering may have an opening 306 near the bottom of the second compartment 106. The heat generated in the second compartment 106 may be channelled through the guiding mechanism 204 and exhausted towards the window 110 through the opening 306.

Additionally, a memory storage device 310 may be provided in the second compartment 106. The memory storage device 310 may store one or more instant images output from the camera 204. The memory storage device 310 may be connected with the camera 204 and the processing unit 205 in the first compartment 104. In an embodiment, the memory storage device 310 may be integrated with the processing unit 205. The memory storage device 310 may act as a temporary buffer or cache to hold the images captured by the camera 204. The processing unit 205 may process the images temporarily held in the memory storage device 310 to set its register with binary information on the operating status of the sight glass 114. In an exemplary embodiment, the memory storage device 310 may also be placed in the first compartment 104 on the camera circuit board 202.

Figure 4:
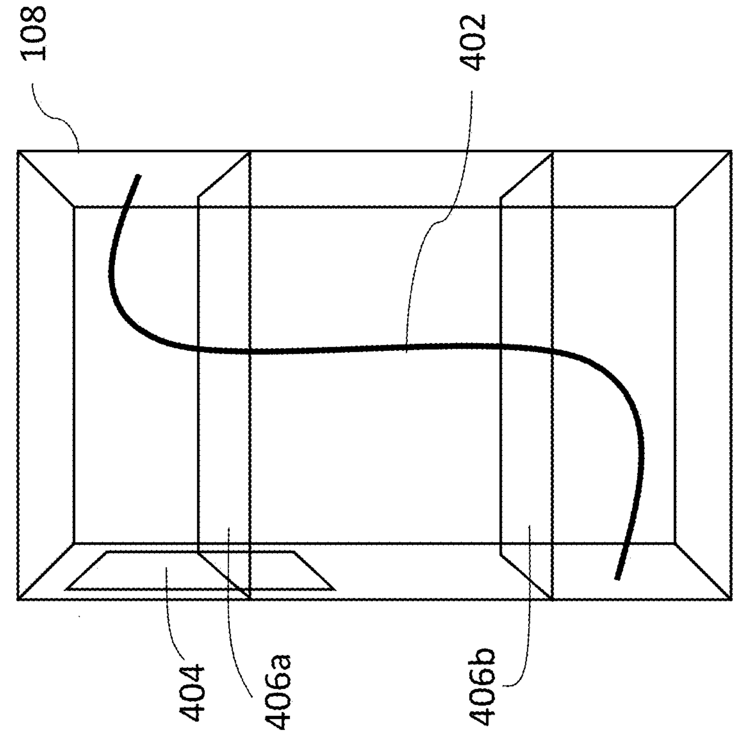
FIG. 4 illustrates a detailed view of the isolation cell of the optical monitoring device.

FIG. 4 illustrates a detailed view of the isolation cell 108 of the optical monitoring device 100.

The isolation cell 108 may be placed between the first compartment 104 and the second compartment 106 of the optical monitoring device 100. All the cables 402 leading from the supply circuit board 302 to the camera circuit board 202 and the illumination board 208 may be contained in the isolation cell 108. The isolation cell 108 may also contain cables, if any, connecting the camera circuit board 202 and the illumination board 208.

By separating the first compartment 104 and the second compartment 106, the isolation cell 108 may thermally isolate the first compartment 104 from the effects of high temperature and heat generated by the supply circuit board 302 in the second compartment 106. The isolation cell 108 may be a moulded enclosure consisting of two additional partitions or walls 406*a* and 406*b* and may be made of any heat-resistant material such as, but not limited to, plastic, ceramic, or a combination thereof. Said walls 406*a* and 406*b* may be isolators and may make the isolation cell 108 narrow. In an embodiment, the walls 406*a* and 406*b* may allow mechanical placement of a moisture absorber 404 and the cables 402. Additionally, the walls 406*a* and 406*b* may also provide support for circuit boards in adjacent compartments.

In an embodiment, the moisture absorber 404 may be fixed mechanically in the isolation cell 108 at one position. The moisture absorber 404 may include any material capable of absorbing moisture from its surrounding environment, such as, but not limited to, hydrogel, silica gel, or the like. The moisture absorber 404 may prevent the accumulation of moisture on the internal components of the optical monitoring device 100. This may reduce the impact of moisture that may be present during installation in a piping system of the HVAC/R system 112.

Figure 5:
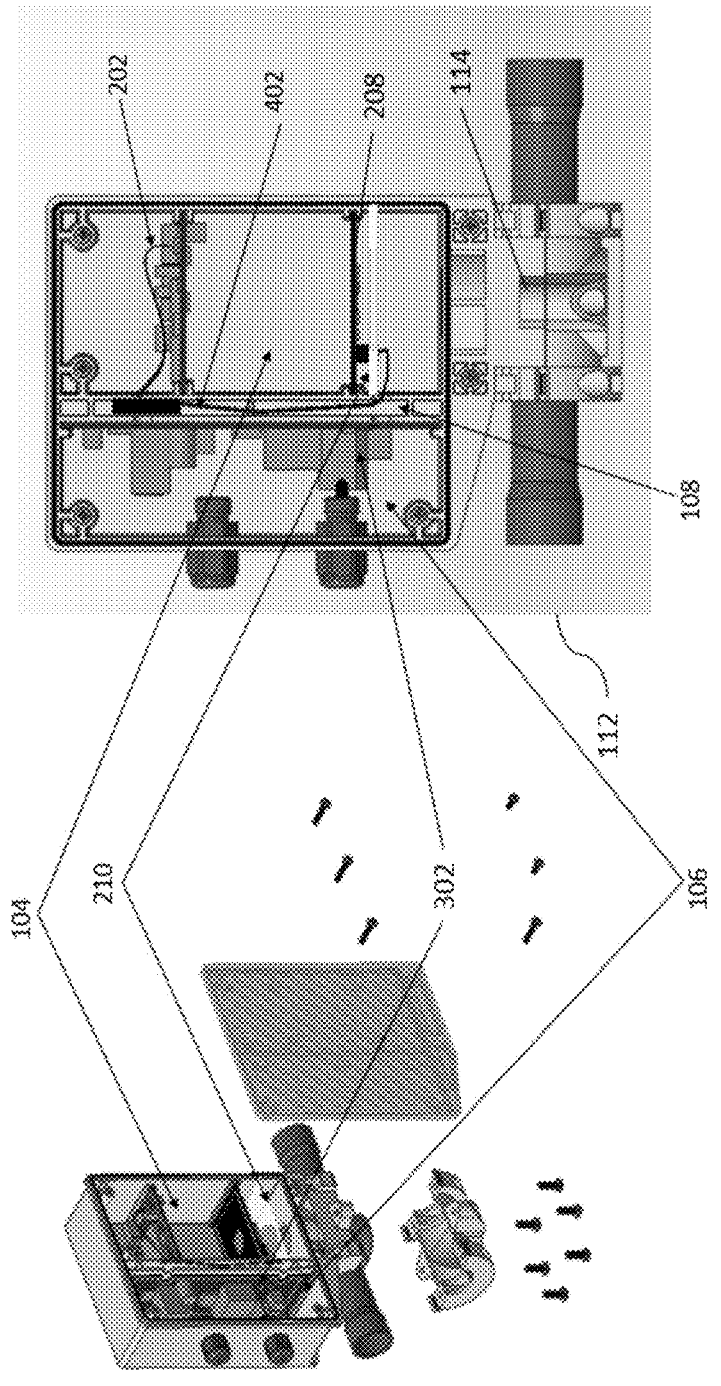
FIG. 5 illustrates a cross-sectional view of an optical monitoring device installed onto a sight glass in a heating, ventilation, and air conditioning and refrigeration (HVAC/R) system.

FIG. 5 illustrates a cross-sectional view of an optical monitoring device installed onto a sight glass in a heating, ventilation, and air conditioning and refrigeration (HVAC/R) system.

The window 110 through the optical monitoring device 100 may be configured to align with the aperture of the illumination board 208, the aperture of the light dispersion layer 210, and the lens of the camera 204 installed on the camera circuit board 202 such that the camera 204 may clearly view the sight glass 114 of the HVAC/R system 112 through the window 110 of the optical monitoring device 100.

In some scenarios, when the saturation temperature of the air within the housing of the sight glass 114 is greater than the temperature of the transparent surface of the sight glass 114, water condensation may occur on the surface of the sight glass 114. Condensation on the transparent surface of the sight glass 114 may cause an accumulation of moisture or water which might obscure the view of the camera 204. To address this problem, an anti-fog film or coating may be placed on the sight glass 114 to mitigate the occurrence of condensation on it blocking the view of the camera 204 through it. In an embodiment, the optical monitoring device 100 may be installed on the sight glass 114 with an anti-fog film or coating applied to it.

As shown in FIG. 5, besides the cables leading from the power supply circuit board 302 in the second compartment 106 to the first compartment 104, the isolation cell 108 may also be used to lead cables for connecting illumination board 208 and the camera circuit board 202 within the first compartment 104.

The optical monitoring device 100 may be installed over a piping section of the HVAC/R system 112, as illustrated in FIG. 5, in a gauge having a sight glass 114 for allowing visual display of the color change material sample to be viewed through the optical monitoring device 100.

Figure 6:
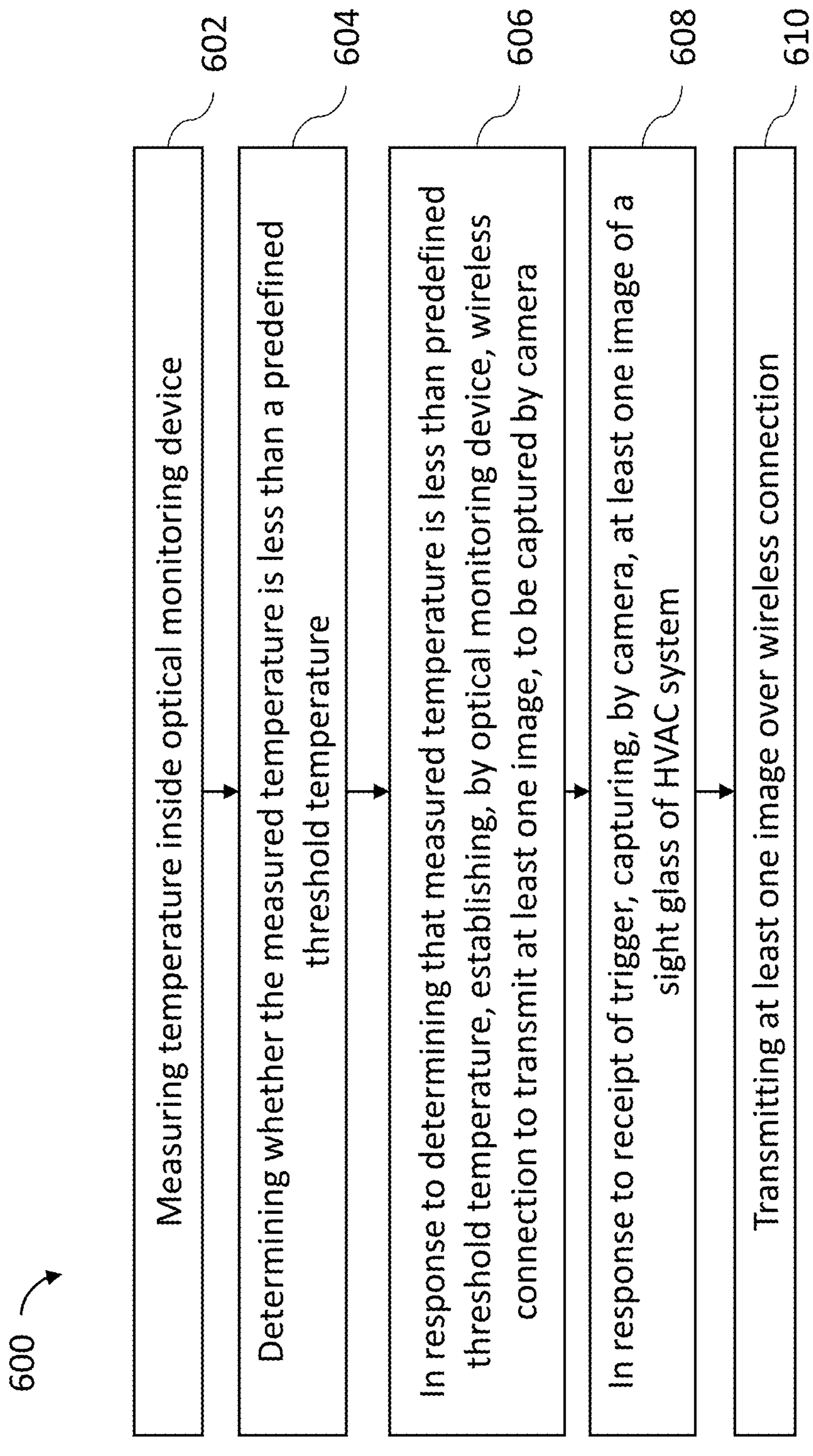
FIG. 6 illustrates a flowchart depicting a method of operating an optical monitoring device mounted on a heating, ventilation, air conditioning and refrigeration (HVAC/R) system.

FIG. 6 illustrates a flowchart depicting a method 600 of operating an optical monitoring device mounted on a Heating, Ventilation, and Air Conditioning (HVAC/R) system.

The method 600 of operating the optical monitoring device 100 mounted on the HVAC/R system 112 is disclosed. At step 602, the method 600 may include, measuring a temperature inside first compartment of the optical monitoring device 100. In an embodiment, the temperature may be measured in the vicinity of camera 204 disposed on the camera circuit board 202. The temperature may be measured by temperature sensing element like thermistor Thereafter, at step 604, the method 600 may include determining whether the temperature is less than a predefined threshold temperature. The predefined threshold temperature may be a maximum ambient temperature that may be allowed for the functioning of the internal components of the optical monitoring device 100, such as the camera 204 and the wireless connection circuit board 206 as they may be severely affected if the temperature rises above the predefined threshold temperature. In an exemplary embodiment, the predefined threshold temperature may be set at 65 degrees Celsius. In another exemplary embodiment, the predefined threshold temperature may be set at 70 degrees Celsius. Since the continuous working of a wireless connection may considerably raise the ambient temperature, it ultimately hampers the wireless connection. Establishing the wireless connection only when the temperature is below the predefined threshold temperature may help in mitigating the issue of rising temperature.

The method 600 for operating an optical monitoring device may include, at step 606, establishing a wireless connection to transmit at least one image, to be captured by a camera 204, in response to determining the temperature being less than a threshold temperature. In an embodiment, the wireless connection may be established with an application installed in a user equipment, UE. In an exemplary embodiment, the UE may be a smartphone, laptop, or desktop having a user interface capable of displaying the optical monitoring device 100 information. The user interface may also be capable of sending a trigger to the optical monitoring device 100, to capture images of the sight glass 114 and share the same over a wireless connection. The terms 'user equipment' and 'user device' have been used interchangeably throughout the specification.

Further, at step 608, the method 600 may include, in response to receipt of a trigger, the camera 204 may capture the images of the sight glass 114 as viewed through the window 110. In an embodiment, the trigger may be a manual trigger received from an application installed on the external device used by the operator or an automated trigger received from the controller 116 of the HVAC/R system 112. In an embodiment, the illumination of the window of the optical monitoring device may also be controlled. The one or more light sources 212 may be powered on after detecting that the camera 204 is being used to capture image data. Consequently, the illumination timing of the window 110 may also be managed to correlate with the image capturing timing of the camera 204. Accordingly, images of the sight glass 114 may be captured through the illuminated window 110 of the optical monitoring device 100.

Finally, the method 600 may include, at step 610, transmitting at least one image over the wireless connection to the web server accessible by a user equipment being used by the operator of the HVAC/R system 112.

Figure 7:
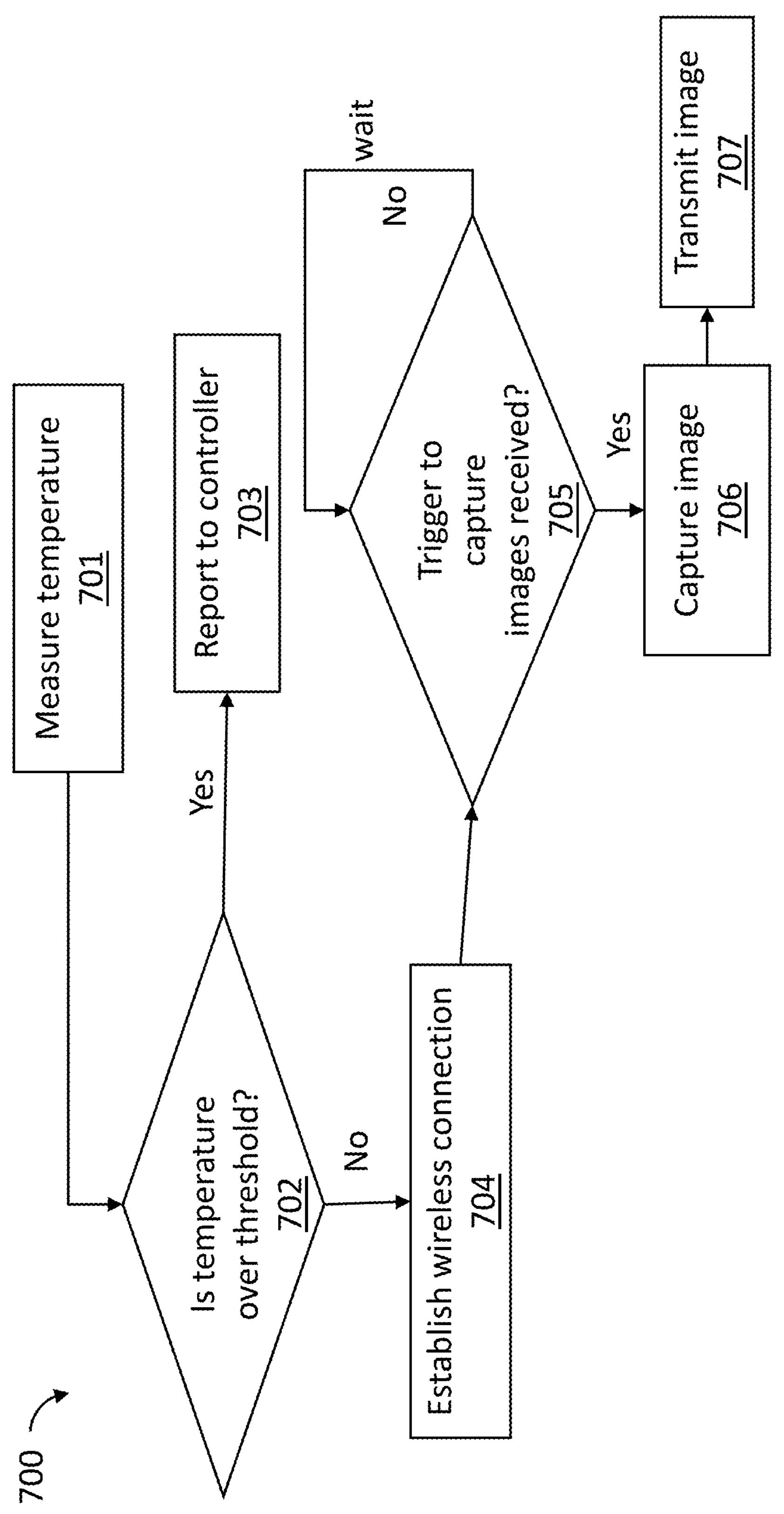
FIG. 7 illustrates a flowchart depicting the workflow of the method of operating an optical monitoring device mounted on the Heating, Ventilation, and Air Conditioning (HVAC/R) system.

FIG. 7 illustrates a flowchart depicting the workflow 700 of the method 600 of operating an optical monitoring device 100 mounted on the Heating, Ventilation, and Air Conditioning (HVAC/R) system. Block 701 depicts the method step of temperature measurement inside the optical monitoring device 100, and block 702 depicts determining if the measured temperature is over the predefined threshold temperature. If the measured temperature is over the threshold temperature, the controller 116 is informed by the optical monitoring device at block 703 indicating abnormal operating status of said optical monitoring device. In an embodiment, the abnormal operating status of the optical monitoring device may also be informed to an application hosted on a user device. However, if the temperature is below the threshold temperature, a wireless connection with the external user equipment may be established at block 704. The optical monitoring device 100 then waits to receive a trigger to capture images of the sight glass 114 as shown in block 705. The trigger may be a manual trigger received via the application installed on the external device used by the operator or an automated trigger received from the controller 116 of the HVAC/R system 112. Once a trigger is received, at least one image of the sight glass 114 is captured at block 706 and transmitted to the user equipment at block 707.

Figure 8:
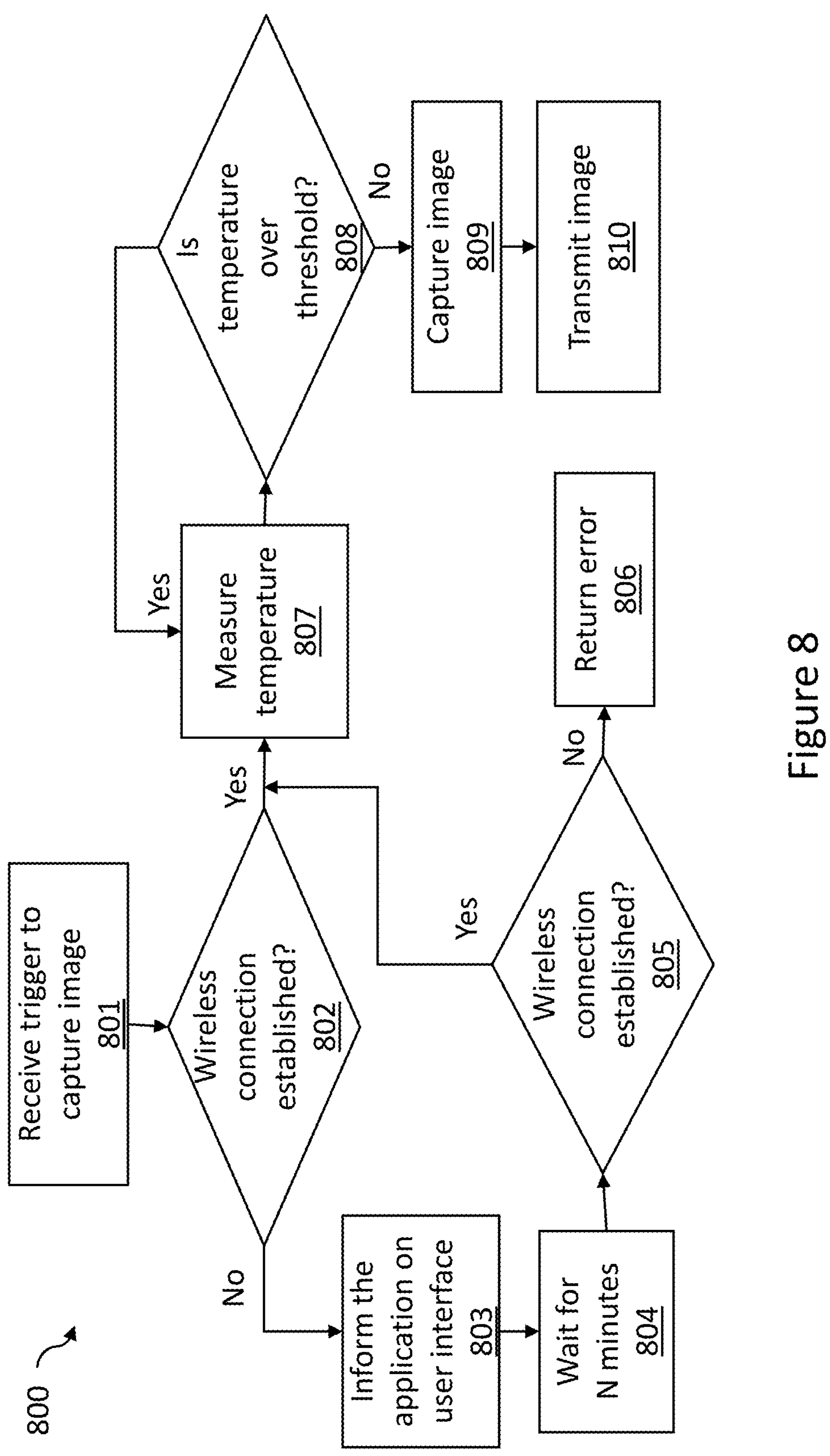
FIG. 8 illustrates a flowchart depicting an alternate workflow of the method of operating an optical monitoring device mounted on the Heating, Ventilation, and Air Conditioning (HVAC/R) system.

FIG. 8 illustrates a flowchart depicting an alternate workflow 800 of the method 600 for operating the optical monitoring device mounted on the HVAC/R system 112. The workflow 800 may be followed when the optical monitoring device 100 is operated using an application installed on the user equipment. A trigger to capture images of the sight glass 114 may be received from the application, at block 801. Thereupon, if it is determined, at block 802, that a wireless connection is not established, information about a wireless connection not established is displayed on the user interface of the application, at block 803. Additionally, it is also informed, at block 804, that the system may wait for N minutes for the wireless connection to be established, and again check if the wireless connection has come up at block 805. If the wireless connection is still not established, an error is reported on the user interface of the application, at block 806. However, if the wireless connection comes up, the temperature is measured at block 807.

At block 802, if the wireless connection is established, the temperature is measured at block 807. If the measured temperature is over the predefined threshold temperature, at block 808, the system may wait and measure the temperature again until the temperature falls under the threshold temperature, at block 808. When the temperature is found to be below the threshold temperature, the optical monitoring device 100 may capture images of the sight glass 114 at block 809 and transmit the captured images at block 810.

Figure 9:
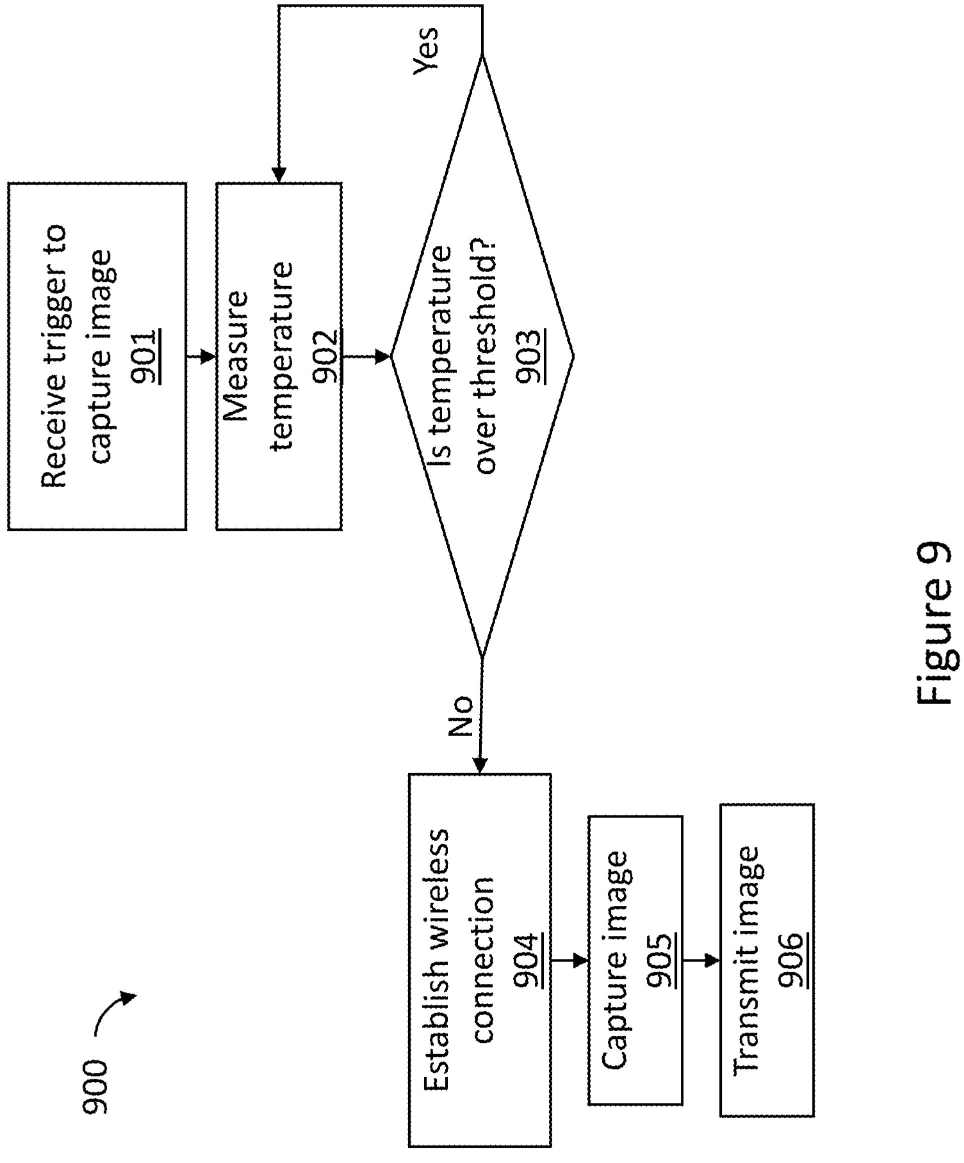
FIG. 9 illustrates a flowchart depicting yet another workflow of the method of operating an optical monitoring device mounted on the Heating, Ventilation, and Air Conditioning (HVAC/R) system.

FIG. 9 illustrates a flowchart depicting yet another workflow 900 of the method 600 for operating the optical monitoring device 100 mounted on the HVAC/R system 112. Workflow 900 may be followed when a manual trigger to capture images is received at block 901. The manual trigger may be received by pressing a button on a user device associated with the optical monitoring device 100. In an exemplary embodiment, the user device may the controller 116 of the HVAC/R system 112. Thereupon, the temperature is measured at block 902. If the measured temperature is over the threshold temperature, at block 903, the system may wait and measure the temperature again until the temperature falls under the threshold temperature. When the temperature is found to be below the threshold temperature, a wireless connection is established at block 904. The optical monitoring device 100 may capture images of the sight glass 114 at block 905 and transmit the captured images at block 906.

In the above-described embodiments of the disclosure, a robust monitoring system is defined which is capable of reducing the impact of high temperature on its internal components by isolating heat-generating power supply components from the operating components of the optical monitoring device. Accordingly, various limitations of the current monitoring systems have been addressed and resolved.

While specific language has been used to describe the subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method of operating an optical monitoring device mounted on a Heating, Ventilation, and Air Conditioning (HVAC/R) system, the method comprising:

measuring a temperature inside the optical monitoring device;

determining whether the measured temperature is less than a predefined threshold temperature;

in response to determining that the measured temperature is less than the predefined threshold temperature, establishing, by the optical monitoring device, a wireless connection to transmit at least one image, to be captured by a camera;

in response to receipt of a trigger, capturing, by the camera, the at least one image of a sight glass of the HVAC/R system; and transmitting the at least one image over the wireless connection.

2. The method of claim 1, wherein the trigger comprises one of a manual trigger received via an application or an automated trigger received from a controller.

3. The method of claim 1, wherein in response to determining that the measured temperature is more than the predefined threshold temperature, the method comprises reporting an abnormal operating status of the optical monitoring device to a controller or a remote application hosted on a user device.

4. An optical monitoring device comprising:

a housing comprising a first compartment; and a processing unit configured to:

determine whether a measured temperature is less than a threshold temperature; and in response to determining that the measured temperature is less than the predefined threshold temperature, establish, by the optical monitoring device, a wireless connection to transmit at least one image.

5. The optical monitoring device according to claim 4, wherein the processing unit is further configured to transmit a trigger to a camera to capture the at least one image.

6. The optical monitoring device according to claim 4, further comprising a wireless connection circuit board configured to transmit the at least one image over the wireless connection.

7. The optical monitoring device according to claim 4, wherein the housing further comprises a second compartment.

8. The optical monitoring device according to claim 7, wherein the housing further comprises an isolation cell to isolate the first compartment and the second compartment.

9. The optical monitoring device according to claim 4, further comprising a camera configured to capture the at least one image.

10. The optical monitoring device according to claim 9, further comprising an illumination board configured to project light for operation of the camera.

11. The optical monitoring device according to claim 5, wherein the trigger comprises one of a manual trigger or an automated trigger.

12. The optical monitoring device according to claim 4, wherein the processing unit is further configured to:

determine whether the measured temperature is more than the threshold temperature; and in response to determining that the measured temperature is more than the threshold temperature, report an abnormal operating status of the optical monitoring device to the processing unit or a remote application hosted on a user device.

13. The optical monitoring device according to claim 8, wherein the isolation cell comprises at least one cable.

14. The optical monitoring device according to claim 8, wherein the isolation cell further comprises a moisture absorber.

15. The optical monitoring device according to claim 14, wherein the moisture absorber comprises one of a hydrogel and a silica gel.

16. The optical monitoring device according to claim 10, further comprising a light dispersion layer placed between the illumination board and a window in the optical monitoring device.

17. The optical monitoring device according to claim 4, wherein the first compartment comprises a camera circuit board and a wireless connection circuit board.

18. The optical monitoring device according to claim 7, wherein the second compartment comprises a supply circuit board.

19. The optical monitoring device according to claim 18, further comprising a guiding mechanism configured to guide heat generated from the supply circuit board toward a sight glass.

20. An HVAC/R system comprising the optical monitoring device according to claim 4.

* * * * *